US006325930B2

(12) United States Patent
Farley

(10) Patent No.: US 6,325,930 B2
(45) **Date of Patent: *Dec. 4, 2001**

(54) FILTERED SHOWERHEAD

(76) Inventor: David K. Farley, 1827 Capital St., Corona, CA (US) 91720

( * ) Notice: Subject to any disclaimer, the term of this patent is extended or adjusted under 35 U.S.C. 154(b) by 0 days.

This patent is subject to a terminal disclaimer.

(21) Appl. No.: 09/754,047

(22) Filed: Jan. 3, 2001

Related U.S. Application Data

(63) Continuation of application No. 09/340,514, filed on Jun. 28, 1999, now Pat. No. 6,214,224.

(51) Int. Cl.[7] .......... B01D 27/02
(52) U.S. Cl. .......... 210/282; 210/449
(58) Field of Search .......... 210/282, 287, 210/449; 239/553.3, 553.5

(56) References Cited

U.S. PATENT DOCUMENTS 4,275,908 * 6/1981 Elkins et al. .......... 285/55
5,152,464 * 10/1992 Farley .......... 239/553.3
5,503,742 * 4/1996 Farley .......... 210/238
5,545,314 * 8/1996 Parise et al. .......... 210/282
5,549,822 * 8/1996 Ferguson .......... 210/449
6,214,224 * 4/2001 Farley .......... 210/282

* cited by examiner

*Primary Examiner*—Ivars Cintins
(74) *Attorney, Agent, or Firm*—James G. O'Neill

(57) ABSTRACT

A showerhead having a water filter element held therein. The water filter element is easily changeable by unscrewing two halves of a body forming the showerhead. The body halves are easily gripped and turned, so as to be opened or closed, and the showerhead preferably includes a massage-type head at the lower end thereof, which may be rotated to vary the streams of water exiting the showerhead. The water filter element cooperates with internal components of the halves of the body to direct the flow of water through the filter element, and then out of the massage head. The showerhead may be easily and quickly adapted to be held on any shower arm, and to replace any existing showerhead without taking up as much room as currently existing filter elements used with available showerheads.

4 Claims, 1 Drawing Sheet

FILTERED SHOWERHEAD

This is a continuation of application Ser. No. 09/340,514, filed Jun. 28, 1999, now U.S. Pat. No. 6,214,224.

BACKGROUND OF THE INVENTION

1. Field of the Invention

This invention relates generally to showerheads, and, more particularly, to an improved, compact showerhead, having a water filter therein.

2. Description of Related Art

Shower filters for use in conjunction with showerheads are known. These filters may be inserted into a water line, between the showerhead and the shower arm. However, because of the size of the filter and the added showerhead, this moves or offsets the showerhead so that it extends further into a shower area and, in some cases, interfering with a person taking a shower. Because of problems with a size and the installation of such known shower filters, as well as the high cost of manufacturing, there exists the need in the art for a less-cumbersome, easy-to-install and move, low-cost combination showerhead and water filter device, that is also compact, and takes up a minimum of space.

Known shower filter assemblies are set forth in U.S. Pat. No. 5,503,742 to Farley, U.S. Pat. No. 5,300,224 to Farley, and U.S. Pat. No. 5,152,464 to Farley. While the foregoing prior art devices provide improved filtration of hot water passing through them, they require that a separate showerhead be attached to an outlet of the filters, thereby extending the size of the joined showerhead and shower filter.

SUMMARY OF THE INVENTION

Accordingly, it is a general object of the present invention to provide an improved shower head assembly. It is a particular object of the present invention to provide a combination shower filter and showerhead. It is a still more particular object of the present invention to provide a compact showerhead and water filter combination that take up a minimum amount of space. It is a further object of the present invention to provide a compact combined showerhead and water filter that may be easily attached to an existing shower arm, and take up substantially no more space than known showerheads having no filter therein.

The showerhead of the present invention, with its replaceable filter, is compact and may be provided with a message-type spray head, to eliminate the bothersome extension of known shower filters, added before existing showerheads. The showerhead of the present invention provides a more-efficient and economical incorporation of a water filter in a showerhead having a single ergonomically designed body.

In accordance with one aspect of the present invention, there is provided a combination showerhead and water filter assembly having a compact design, which utilizes the internal water filter to direct water entering the showerhead to pass through filter media held in the water filter. In this manner, chlorine and other unwanted materials in the water are filtered out in the showerhead. The combination showerhead and water filter are held in a single body or housing that is made as small as possible, to take up a minimum amount of space. Additionally the single body is easily disassembled to replace or remove the water filter held therein, and provides a compact showerhead and water filter assembly that may be used in substantially any shower, without extending tolfar into the shower area.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein like reference numerals are used throughout the several views, and, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved combination showerhead and water filter assembly, generally indicated by the numeral 10.

Figure 1:
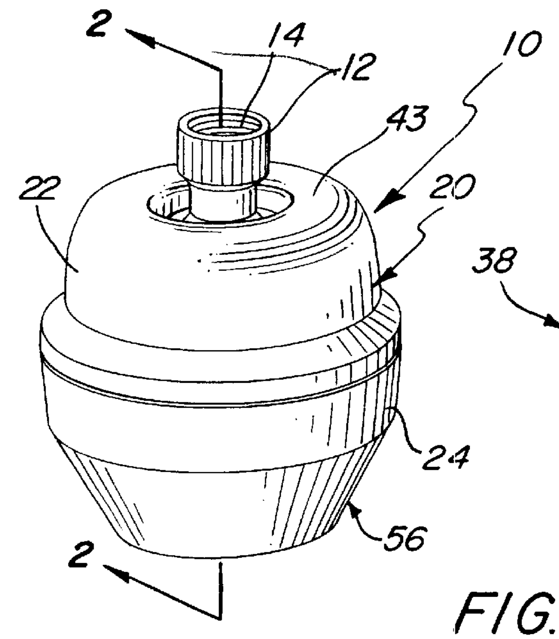
FIG. 1 is a perspective view of a preferred embodiment of the combination showerhead and water filter assembly of the present invention.
Figure 3:
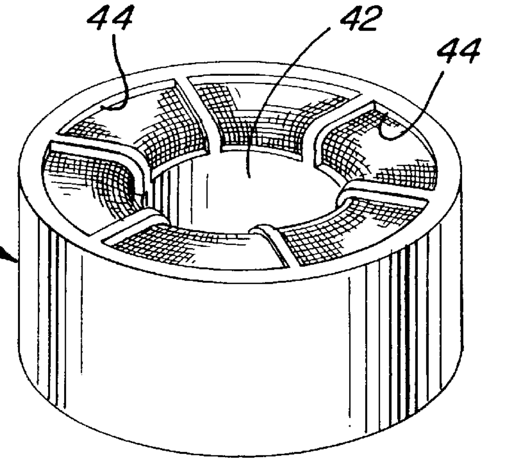
FIG. 3 is a perspective view of the replaceable water filter of the present invention.
Figure 2:
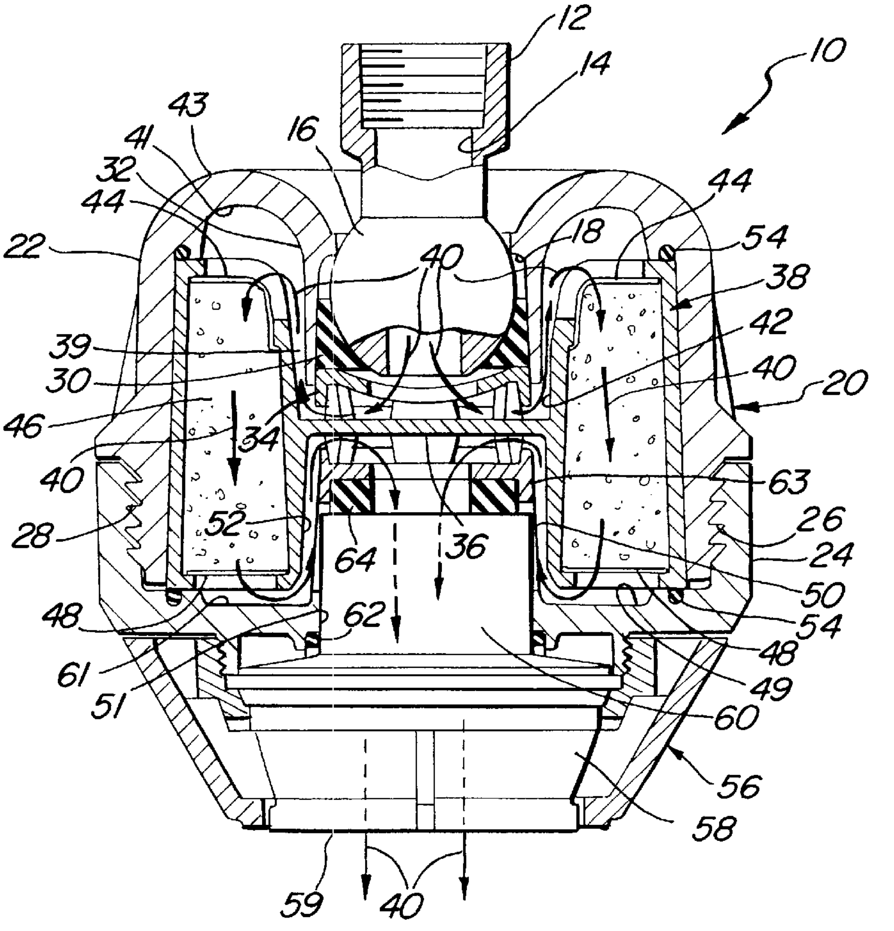
FIG. 2 is an enlarged cross sectional view taken along line 2—2 of FIG. 1, looking in the direction of the arrows.

Turning now to the drawings, FIGS. 1 and 2, there shown is a preferred embodiment of the compact showerhead and water filter assembly 10 of the present invention. The combined showerhead and water filter is held in a body 20, which may be fixed to the end of a shower arm or water pipe, not shown, by means of a threaded inlet end 12 having an inlet passage 14. The inlet passage 14 is preferably formed integrally with a rotatable element 16, such as a ball joint or swivel ball that allows the unit 10 to be moved. The ball joint or swivel ball 16 is rotatably held in a recessed opening 18 formed in a top surface of a top or upper half 22 of the body 20. The body 20 includes a mating bottom or lower half 24, which is secured to the top half 24 by internal and external threads 26, 28 formed on mating end portions of the top and bottom halves 22, 24. The ball joint 16 is held in the recessed opening 18 by means of an annular sealing element 30 and a first baffle element 34.

Although the top and bottom halves 22, 24 of body 20 may be formed in any desired shape, they are preferably hollow and include cylindrical mating portions which are held together, as shown in FIGS. 1 and 2. The recessed opening 18 is formed in an inwardly extending annular housing portion 32 formed in a top surface 43 of the top half 22. The annular sealing element 30 is captured in a lower end of this annular housing portion 32 to prevent leakage past the ball joint 16. Additionally, the baffle element 34, such as an annular element having at least one opening therein is held within a lower end of the annular housing 32 and acts to hold the annular sealing element 30 against the ball joint 16. The baffle element 34 cooperates with extending portions of a central dividing member or wall 36 of a filter element 38 captured within an internal chamber formed between the two halves 22, 24 to form a first baffle means to deflect the water entering from inlet passage 14. The filter element 38 included an annular body portion that cooperates with the baffle means to direct the flow of water entering inlet 14 in the direction of arrows 40. After entering inlet 14, water is deflected off the baffle means including the element 34 and a top surface of central dividing member or wall 36. The water then flows into an annular. passage 39 formed between an inner surface or wall of annular housing 32 and an upper inner wall 42 formed on the top portion of the annular body of filter element 38, above the dividing member 14. The water is then deflected by curved inner walls 41 of the top surface 43 into a plurality of inlet openings 44 formed in the top of the annular housing of filter 38. The openings 44 include a screen or wire mesh therein to hold a filter media 46 in the annular housing. This filter media is preferably a chlorine removing media, such as Chlorgon™, manufactured by Sprite Industries of Corona California and is described in U.S. Pat. No. 5,914,043, issued Jun. 22, 1999. Water passes through the filter media 46 and out a plurality of exit openings 48 formed in a lower part of the annular housing of filter element 38. Exit openings 48 also having a wire mesh or screen held therein to keep the filter media 46 within the annular housing.

The filter element 38 is securely held in the internal chamber formed by the mating halves 22, 24, when they are screwed together by the internal and external threads 26, 28 on the outer ends of each of the halves. Sealing elements 54, such as O-ring seals, are held in annular grooves formed in annular supporting portions or walls formed within each of the top and bottom halves, and cooperate with flat ends of the annular housing to seal the filter element 38 within the internal chamber of housing 20.

The lower half 24 of body 20 includes a bottom or lower wall 49 having a central opening 51 formed therein. A valve end of the showerhead 10 preferably includes an adjustable means 56, commonly referred to as a "massage head" at a lower or outer end of the bottom or lower half 24, below the wall 49. This massage head is movable to provide various spray patterns, varying between a fine spray and a massaging or pulsating spray from a plurality of openings, not shown, in an outer end 59 of an internal portion 58, in a manner well known to those skilled in the art. The internal portion 58 is included in massage head 56, and includes a cylindrical upper portion 60, which is sealed in the opening 51 by a sealing element 62, such as an O-ring. A further sealing ring 64 is held by a further or second baffle element 63 against an inner end of the upper cylindrical portion 60. The second baffle element 63 cooperates with extending portions of a bottom surface of the central dividing member or wall 36 to provide a baffle means, which directs the water flow back to the centerline of the showerhead, before exiting through outer end 59.

The lower wall 49 includes an annular groove 61 formed therein, and water exiting openings 48 will be deflected by this annular groove 61 into an annular passage 50 formed between a lower internal wall 52 of the annular housing of the filter element 38, below the central dividing plate or wall 36, and an outer surface or wall of the cylindrical element 60. After flowing through the annular passage 50, the water is then turned back to the centerline of the showerhead by the baffle means 36, 63. The water then flows through the annular sealing element 64, and out through an internal passage formed through upper cylindrical portion 60 and the internal portion 58 of massage head 56.

When the top and bottom halves 22, 24 are assembled, as by being screwed together, the filter element 38 is held within the internal chamber formed therein and cooperates with the internal chamber to direct water flow through filter media held therein. The filter element 38 may be easily changed by unscrewing the top and bottom halves, removing the filter, and refilling the filter with new filter media, or replacing the entire filter. The filter media held within the filter 38 may be any desired filter media, but is preferably Chlorgon™, as described above, which removes chlorine and other unwanted materials from hot shower water.

All of the elements of showerhead filter assembly of the present invention may be fabricated in any desired manner, using any acceptable material, such as by molding plastic materials to form the various elements. Each of the elements is sized and dimensioned so that it is of minimum size, but is still capable of being secured to other elements and to a shower arm, as by means of the threaded end 12, so as to accommodate a water filter of sufficient size to filter out unwanted contaminants from hot shower water, without taking up more space than available showerheads having no filters therein.

Accordingly, as will be apparent to those skilled in the art, the assembly of the present invention provides considerable advantages in ease and flexibility of manufacture of showerheads and water filters. Additionally, the showerhead and water filter combination of the present invention is easy to use and install, and takes up substantially less space than known showerheads and separately attached shower filters. The top and bottom halves of the showerhead assembly are easily taken apart, for installation and removal of the filter element contained therein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A showerhead comprising:

a single body containing a pivotable inlet, a shower filter and a shower spray outlet;

the single body comprised of a top hollow mating half having the pivotable inlet therein and a bottom hollow mating half having the shower spray outlet therein;

the top hollow mating half and the bottom hollow mating half being held together by matching threads formed at mating ends thereof to form a hollow internal chamber; and a water filter assembly having a plurality of inlet openings and a plurality of exit openings and a filter media held therein; the water filter assembly being secured in the hollow internal chamber.

2. The showerhead of claim 1, further including means in the internal chamber for directing flow of water from the pivotable inlet through the water filter and out of the shower spray outlet.

3. A showerhead comprising:

a single body containing a pivotable inlet, a shower filter and a shower spray outlet;

the single body comprised of a top hollow mating half having a recessed annular housing portion having the pivotable inlet held therein, and a bottom hollow mating half having the shower spray outlet therein;

the top hollow mating half and the bottom hollow mating half being held together by matching threads formed at mating ends thereof and forming an internal chamber;

a water filter assembly having a plurality of inlet openings and a plurality of exit openings with a filter media held therein; the water filter assembly being secured in the internal chamber; and at least one baffle held in the internal chamber for directing flow of water from the pivotable inlet through the water filter assembly.

4. A showerhead comprising:

a single body containing a pivotable inlet, a shower filter and a shower spray outlet;

the single body being substantially cylindrical and having a top hollow mating half with an annular housing portion having the pivotable inlet held therein and a bottom hollow mating half having a massage head held therein;

the top hollow mating half and the bottom hollow mating half having end portions formed thereon, which end portions are screwed together so as to form an internal chamber;

a water filter assembly held in the internal chamber;

the water filter assembly having an inner chamber with filter media held therein and a plurality of inlet openings and a plurality of exit openings connecting to the inner chamber;

a first baffle element held in the internal chamber, on an upstream side of the water filter assembly;

a second baffle element held in the internal chamber on a downstream side of the water filter assembly;

the first baffle element and second baffle element cooperating with the top hollow mating half and the bottom hollow mating half to direct flow of water from the pivotable inlet into the plurality of inlet openings through the filter media in the water filter assembly, out the plurality of exit openings and through the massage head.

* * * * *

UNITED STATES PATENT AND TRADEMARK OFFICE
CERTIFICATE OF CORRECTION

PATENT NO. : 6,325,930 B2
DATED : December 4, 2002
INVENTOR(S) : David K. Farley It is certified that error appears in the above-identified patent and that said Letters Patent is hereby corrected as shown below:

Column 4,
Lines 43 and 44, delete “therein”, both occurrences;
Line 49, before “a”, first occurrence, insert -- the shower filter comprising --.

Signed and Sealed this

Fourth Day of May, 2004

JON W. DUDAS
*Acting Director of the United States Patent and Trademark Office*